US008527492B1

(12) United States Patent
Issa

(10) Patent No.: US 8,527,492 B1
(45) Date of Patent: Sep. 3, 2013

(54) ASSOCIATING EXTERNAL CONTENT WITH A DIGITAL IMAGE

(75) Inventor: Alfredo C. Issa, Apex, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 749 days.

(21) Appl. No.: 11/281,100

(22) Filed: Nov. 17, 2005

(51) Int. Cl.
*G06F 7/00* (2006.01)
*G06F 17/30* (2006.01)

(52) U.S. Cl.
USPC .......................................... 707/707; 707/708

(58) Field of Classification Search
None
See application file for complete search history.

(56) References Cited

U.S. PATENT DOCUMENTS

| | | | | |
|---|---|---|---|---|
| 6,904,160 | B2 * | 6/2005 | Burgess | 382/113 |
| 7,349,552 | B2 * | 3/2008 | Levy et al. | 382/100 |
| 2002/0188602 | A1 * | 12/2002 | Stubler et al. | 707/3 |
| 2003/0046268 | A1 * | 3/2003 | Hirabayashi | 707/1 |
| 2005/0044100 | A1 * | 2/2005 | Hooper et al. | 707/102 |
| 2005/0104976 | A1 * | 5/2005 | Currans | 348/231.5 |
| 2005/0120050 | A1 * | 6/2005 | Myka et al. | 707/104.1 |
| 2005/0190273 | A1 * | 9/2005 | Toyama et al. | 348/231.5 |
| 2005/0234905 | A1 * | 10/2005 | Endler et al. | 707/5 |
| 2006/0041591 | A1 * | 2/2006 | Rhoads | 707/104.1 |
| 2006/0064418 | A1 * | 3/2006 | Mierau et al. | 707/9 |
| 2006/0206470 | A1 * | 9/2006 | McIntyre | 707/3 |
| 2006/0238383 | A1 * | 10/2006 | Kimchi et al. | 340/995.1 |
| 2006/0239591 | A1 * | 10/2006 | Kim et al. | 382/305 |
| 2006/0253491 | A1 * | 11/2006 | Gokturk et al. | 707/104.1 |
| 2007/0244925 | A1 * | 10/2007 | Albouze | 707/104.1 |
| 2010/0332958 | A1 * | 12/2010 | Weinberger et al. | 715/201 |

* cited by examiner

*Primary Examiner* — Cheryl Lewis
*Assistant Examiner* — Raheem Hoffler
(74) *Attorney, Agent, or Firm* — Withrow & Terranova, PLLC

(57) ABSTRACT

A method and system is provided for associating external content with a digital image. Aspects of the method and system include extracting metadata from the digital image; using the extracted metadata to query an online content server to retrieve content related to the digital image through at least one attribute of the extracted metadata; in response to receiving the content returned by the content server, associating the content with the digital image; and using the content when an operation is performed on the digital image.

25 Claims, 5 Drawing Sheets

ASSOCIATING EXTERNAL CONTENT WITH A DIGITAL IMAGE

FIELD OF THE INVENTION

The present invention relates to digital imaging and more particularly to a method and system for associating external content with a digital image.

BACKGROUND OF THE INVENTION

Image metadata is essentially non-picture information that is embedded in the image file in addition to the actual image data. Several industry groups and vendors have attempted to define image file formats to specify and support a baseline set of metadata to help promote widespread use of specific metadata by industry and consumers.

Metadata is typically associated with a digital image either at the time the digital image file is created, such as by a digital camera or scanner, or later added to the image by the user using an image editing application. Metadata provided by a digital camera or scanner is typically information about the image; the date and time the picture was taken, by whom, with what equipment, and the like. The data provided by the user are typically keywords, called tags, that are used to categorize the image for subsequent searching. Metadata entered by the user is typically in text format, but may also include audio annotations.

Metadata may be used to the advantage of both vendors and users. For example, metadata can help vendors render digital images with higher quality. A vendor that produces both digital cameras and printers, for instance, may use the metadata extracted from an image to send to a printer driver to allow the printer to enhance the print quality of the image. Users may use metadata to help better organize their images by sorting and searching based on metadata elements such as date and time, location, or keywords, for example. Users also use metadata to annotate images for sharing or for archiving.

For example, a user might take pictures at a sporting event using a digital camera, download the captured images to a PC, annotate the images using an image application, and then share the images with others via email or by posting the annotated images on a photosharing site. The other users might also further annotate the images. Finally, the user may copy the images to an optical drive, such as a DVD/CD or other type of external mass storage device, for archival. When images are archived, the images may be archived with metadata in the image file, or the metadata may be extracted and stored in a separate file or database.

Although image metadata may provide a host of benefits to vendors and users, as described above, the type of information stored as image metadata is typically limited to information describing the image capture process and characteristics of the image, and information entered by the user in the form of keywords and annotations. Consequently, when an image is displayed or archived, the information available for display or archival with the image is also limited to the information describing image capture process and characteristics of the image, and the metadata entered by the user.

There is a need, therefore, for automatic methods for associating external content, i.e., information originating outside of the image metadata, with a digital image when the image is displayed or archived. The present invention, as described below, meets this need.

BRIEF SUMMARY OF THE INVENTION

The present invention provides a method and system for associating external content with a digital image. Aspects of the method and system include extracting metadata from the digital image; using the extracted metadata to query an online content server to retrieve content related to the digital image through at least one attribute of the extracted metadata; in response to receiving the content returned by the content server, associating the content with the digital image; and using the content when an operation is performed on the digital image.

According to the method and system disclosed herein, the present invention expands the information made available for a particular image with information that originates outside of the metadata associated with image. The content may either be stored along with the digital image when the digital image is stored, or displayed contemporaneously with image when the image is viewed. By displaying such content such as media that was created at the time of image capture or information regarding the location of image capture, the present invention enriches a user's experience when viewing the image.

DETAILED DESCRIPTION OF THE INVENTION

The present invention relates to associating content with a digital image. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for associating external content with digital images, wherein external content refers to information originating outside of the image metadata. In accordance with the method and system, an enhanced image application extracts the metadata from a designated image, and the metadata is used to query an online content server to retrieve content related to the image through at least one attribute of the metadata. In response to receiving the content returned by the content server, the enhanced image application associates the content with the digital image and uses the external content when an operation is performed on the image. For example, when the image is saved, the external content may be stored along with the image, and when the image is displayed, the external content is displayed (or played) along with the images.

Figure 1:
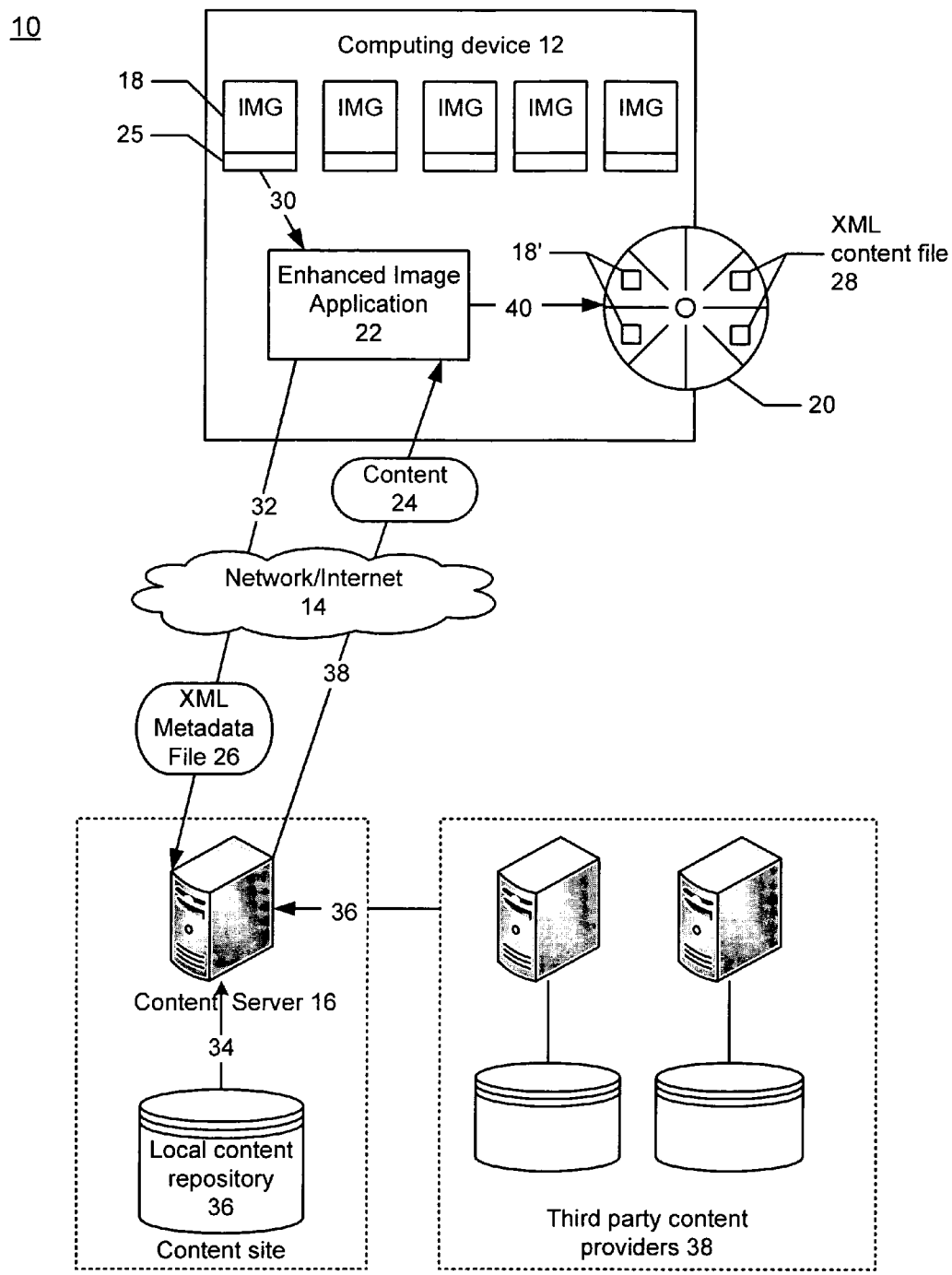
FIG. 1 is a block diagram illustrating a system for use in accordance with the present invention.

FIG. 1 is a block diagram illustrating a system for use in accordance with the present invention. The system 10 includes a computing device 12 in communication with a content server 16 over a network 14, such as the Internet. The computing device 12 may represent any type of electronic device that is capable of storing and/or displaying digital image files 18 (hereinafter, images 18) and communication over the network 14. In a preferred embodiment, the computing device 12 represents a personal or notebook computer, which typically includes components such as a display, processor, memory, hard drive (not shown). In a preferred embodiment, the computing device 12 also includes some type of mass storage device 20, such an optical drive (e.g., CD/DVD) or USB flash drive, appropriate for archiving the images 18. In an alternative embodiment, the computing device 12 may represent other types of electronic devices such as a personal digital assistant (PDA), a camera phone, or a hand-held media player, where the mass storage device 20 is accessible by the computing device 12 over a network, which may be the same or different from network 14.

In accordance with the preferred embodiment, the computing device 12 also executes an enhanced image application 22 that operates in accordance with the present invention. The enhanced image application 22 may be integrated into a traditional image application, provided as a stand-alone application, or provided as a plug-in module for another application (e.g., an image application or browser). The enhanced image application 22 may include the functions of a conventional image application for supporting the display and editing of digital images 18. The enhanced image application 22 preferably supports digital images 18 in any number of native still image file formats, including BMP, JPEG, TIFF, PNG, GIF, WMF, EMF, etc., and any image metadata 25 therein. Thus, the enhanced image application 22 may provide services for managing images 18 in these formats, including image display, editing, emailing, and image uploading to a photosharing site.

Figure 2:
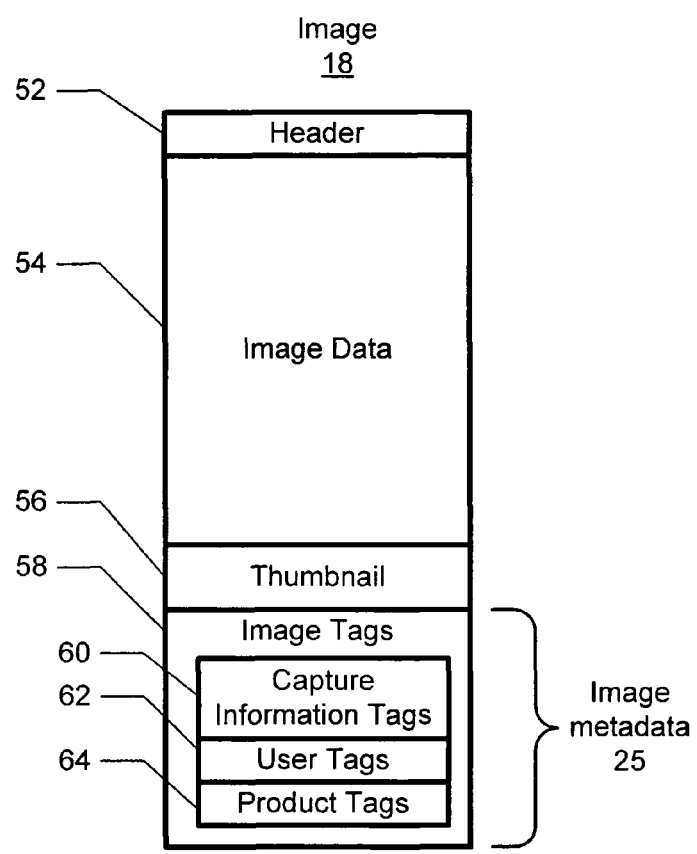
FIG. 2 illustrates a diagram of one file format for image in accordance with an exemplary embodiment.

FIG. 2 illustrates a diagram of one file format for image 18 in accordance with an exemplary embodiment. The image 18 may include a header 52, image data 54, a thumbnail 56, and a set of image tags 58 embedded in the file as image metadata 25. Header 52 preferably includes information that identifies and describes the various contents of image file 62. Image data 54 contains actual captured image data. The image data 54 is the actual data comprising the full-sized captured image typically in compressed form. Although the user can typically choose the resolution mode in which images are captured, the image data 54 is the high-resolution representation of the image compared to the thumbnail 56, which is a reduced resolution version of the image data 54 that is used for a number of special viewing applications.

Image tags 58 stored as the metadata 25 include various types of information that correspond and relate to particular captured image data 54. In one embodiment, the image tags 58 may include capture information tags 60, user tags 62, and product tags 64. Capture information tags 60 preferably include various types of information that preserve command settings at the moment of capture and correlate with the capture image data 54. For example, capture information tags 60 may indicate date and time of capture, focus setting, aperture setting, GPS location data, and other relevant information that may be useful for effectively processing or analyzing the corresponding image data 54. User tags 62 include those keywords or labels a user specifies for a given image, often referred to as "stamps", such as "birthday" or "vacation", etc., that aid in personal categorization of the images of any text data. Product tags 64 typically contain various other information about the image capture device, such as the camera manufacturer and product identification. The image 18 may also include an audio tag field (not shown) for storing a voice annotation that the user may record.

Referring again to FIG. 1, in accordance with the exemplary embodiment, the enhanced image application 22 is configured to use the image metadata 25 to collect external content 24 from a content server 26 (preferably using a standard protocol such as HTTP), and to then associate the external content 24 with the image 18, thereby enhancing the information made available for the image 18.

In operation, the enhanced image application 22 extracts the metadata 25 from the image 18 via line 30, packages the extracted metadata 25 in a file, and sends the file containing the metadata to the content server 16 via line 32. In an exemplary embodiment, the metadata 25 is stored in an XML file, referred to here as an XML metadata file 26. In response to receiving the XML metadata file 26, the content server 16 retrieves from a local content repository 36 and/or from third party content providers 38 content 24 that matches at least one attribute of the metadata via lines 34 and 36, and returns the content 24 via line 38. The enhanced image application 22 associates the content 24 with the image 18 and uses the content 24 when an operation is performed on the image 18 via line 40.

In one exemplary embodiment, the content 24 may be associated with the image 18 by storing the content 24 in a file and associating file with the image 18 through a file naming convention. In an exemplary embodiment, the content 24 is stored as XML, creating an XML content file 28. The XML content file 28 may then be named using a portion of the image name to identify the image to which it is associated. For example, if the name of the image 18 is "IMG006", then the XML content file may be appropriately named "IMG006XML". In an alternative embodiment, the content 24 may be associated with the image 18 by storing the content 24 as one more records in a database (not shown), and using an identifier of the image as an index to the records.

One example of an operation that may be performed on the image 18 includes storing the content 24 (in the form of XML content file 28 or database) with the image 18 when the image 18 is stored. As used herein, a storage operation may include archival, saving, and backup operations, and the image 18 may be stored to a local hard drive or to a typically removable mass storage device such as a DVD/CD/HD-DVD or USB flash drive, for instance, via line 40 as shown. Another example operation is to display or play the content 24 to a user along with the image 18 when the image 18 is displayed. Once the content 24 is associated with the image 18, the enhanced image application 22 includes a viewer (not shown) that is capable of reading and displaying/playing the content 24 associated with the image 18. If an archived image 18' is ever accessed by an application that is not configured to read the enhanced content 24, the enhanced content 24 may be ignored when the image 18' is displayed.

As an example of associating external content 24 with the image 18, assume that the enhanced image application 22 is configured to extract a timestamp (date and time) and GPS position from the metadata 25 associated with the image 18. The enhanced image application 22 sends this metadata to the content server 16 and the content server 16 uses the time/date and GPS metadata as query parameters when querying the local content repository 36. The content 24 returned to the enhanced image application 22 from the query may include the following:

A Map
City, Country
Weather: temperature, barometer reading, conditions
Local news headlines World headlines
Sunrise/sunset times; moon phases
Astronomical information
Pollen count Once, the enhanced image application 22 receives this content 24, the enhanced image application 22 may then store the content 24 as the XML content file 28 on a DVD when archiving the image 18 using a naming convention that associates the XML file with the archived image 18'. When the archived image 18' is subsequently accessed from the DVD, a viewer locates the associated XML content file 28 using the naming convention and displays the content 24 along with the archived image 18'.

According to the preferred embodiment, retrieving content 24 based on metadata elements, such as the image timestamp and GPS position, may result in the retrieval of media that was either created at the time of image capture, or current information regarding the location of image capture regardless of the time of image capture. By displaying such content with the image, the user's image viewing experience is enhanced.

Figure 3:
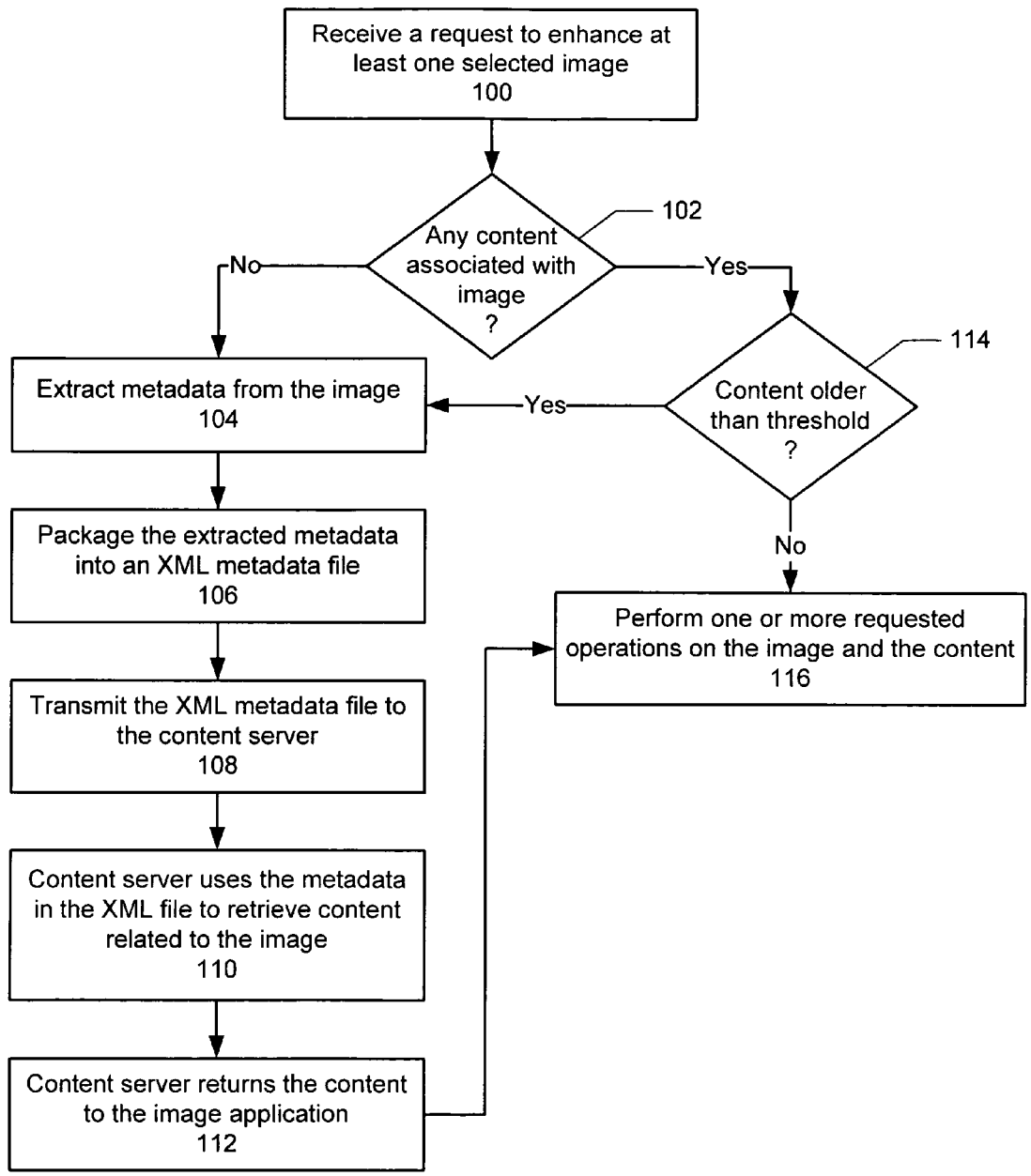
FIG. 3 is a flow diagram illustrating the process performed by the enhanced image application for enhancing the digital image by associating external data with the digital image in accordance with the preferred embodiment.

FIG. 3 is a flow diagram illustrating the process performed by the enhanced image application for enhancing the digital image by associating external data with the digital image in accordance with the preferred embodiment. The process, which assumes that the enhanced image application 22 is executing on the computing device 12, begins in step 100 when the enhanced image application 22 receives a request to enhance at least one selected image 18. The request to enhance the selected image 18 may be initiated by the user through a graphical user interface (GUI) of the enhanced image application 22, or automatically initiated by the application 22 in response to a preconfigured operation or event specified by the user. In one embodiment, the enhanced image application 22 is configured by the user to initiate collection the content 24 for the image 18 in response to detection of the following operations:

Image importing—As the images 18 are imported into the computing device 12, the user can choose to have content 24 collected for all the images 18 being imported, or according to the filters described below.

Image viewing—In response to the user selecting images 18 to view from the hard drive or other storage location of the computing device 12, the application 22 will then collect the content 24 in one of two ways: 1) in batch mode in which all the content 24 for a particular album or set of images 18 the user has decided to view is collected, or 2) one image at a time.

Image storage—As used herein, a storage operation includes archival, saving, and backup operations. In response to the user selecting a set of images to store/archive/backup, the application 22 collects the content 24 from the content server 16 and permanently stores the content 24 with the images 18. The content 24 may be stored either in the image metadata 26, or externally in an external file, folder or database 42.

In a preferred embodiment, when the user selects a batch of images for which to collect enhanced content 24, the user may configure the application 22 to apply filters on the batch such that the image application 22 requests content only for the images 18 that pass the filter. Examples of filters may include the following data elements in the image metadata 36:

1) Timestamp—the filter could be before or after a certain timestamp, e.g., images taken before 1 Jan. 2005 20:30 PM EST.

2) GPS—images within a certain location.

3) Camera settings—various camera settings could be used as filters—flash settings, shutter speed, etc., e.g., images with the flash "on".

4) Manually entered metadata—such as tag or caption matches, e.g., images with the caption "vacation".

In step 102, the enhanced image application 22 determines if any external content 24 has been previously associated with the image 18. This may be accomplished by configuring the enhanced image application 22 to determine if an XML content file 28 has been created for the image 18, or whether any content records exists for the image in a content database.

If it is determined that external content 24 has not been previously associated with the image 18, then in step 104, the enhanced image application 22 begins the process of collecting external content 24 by extracting the metadata 25 from the image 18. The enhanced image application 22 may either extract all the metadata 25 associated with the image 18 or extract only particular metadata fields as configured by the user. Examples of the type of metadata 25 extracted from the image 18 include the date and time of capture, GPS location of the image capture, user manually entered metadata, such as captions and annotations, and other metadata generated by the camera automatically and stored in headers. If the image 18 includes an audio annotation, then the enhanced image application 22 may be configured to perform voice-recognition on the audio annotation to convert the audio into text metadata.

After extracting the metadata 25, in step 106 the enhanced image application 22 packages the extracted metadata 25 into the XML metadata file 26. The metadata 25 extracted from each image 18 may be stored in separate XML metadata files 26 or in a single XML metadata file 26.

Figure 4:
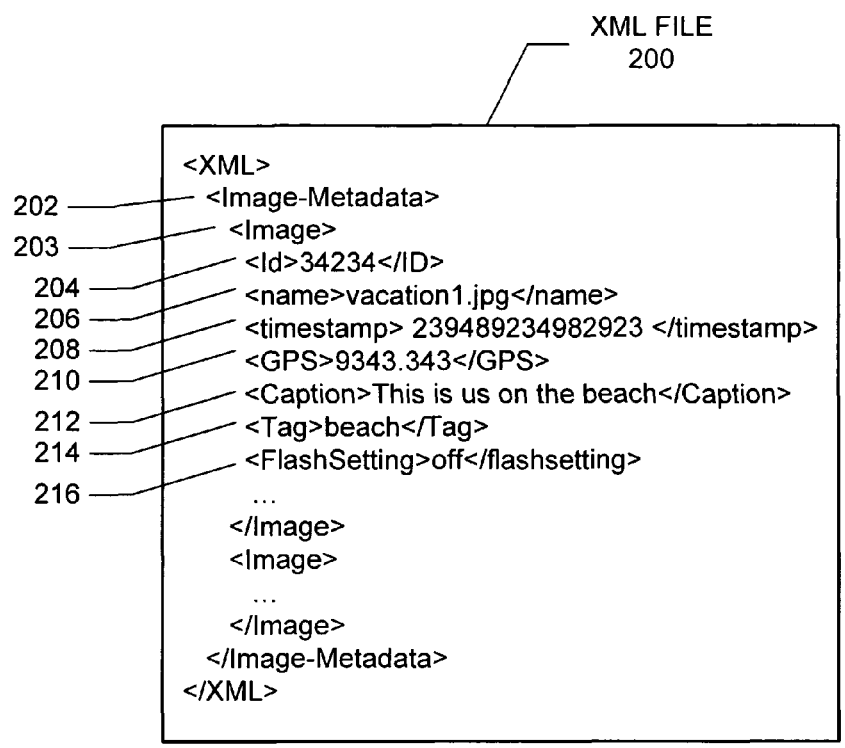
FIG. 4 is a diagram illustrating an example XML format for packaging the metadata.

FIG. 4 is a diagram illustrating an example XML format for packaging the metadata. In this particular example, the metadata 26 extracted from several images is stored in an XML content file 200 under an element called "Image-Metadata" 202. The metadata for each image is stored under a separate <Image> element 203. As shown, the XML content file 200 includes several <Image> elements 203, and each <Image> element 203 includes several sub-elements. In this example, only the sub-elements for one image are shown, which include: an image <ID> element 204 containing the value "34234"; a <Name> element 206 containing the value "vacation 1.jpg"; a <timestamp> element 208 containing the value "239489234982923"; a <GPS> element 210 containing the value "9343.343"; a <caption> element 212 containing the value "this is us on the beach", a <tag> element 214, containing the value "beach"; and a <FlashSetting> 216 containing the value "/flashsetting". Of course the <Image> elements 203 may include other sub-elements other than the ones shown.

Referring again to FIG. 3, in step 108, the enhanced image application 22 transmits the XML metadata file 26 to the content server 16. In step 110, the content server 16 receives the metadata XML file 26 over the network 14 preferably using HTTP and uses the metadata in the XML file to retrieve content 24 related to the image 18. The content server 16 may retrieve the content 24 from a local content repository 36, from third party content providers 38, or both. To collect content from the local content repository 36, the content server 16 uses certain metadata keywords from the XML content file 26 as query parameters to search the local content repository 36 for content containing those keywords. For example, if the metadata 26 has certain medical keywords as tags, then the content server 16 may use those medical keywords to search the local content repository 36 and retrieve the content 24 containing those keywords.

To collect content from the third party content providers 38, the content server 16 sends the metadata keywords from the XML content file 26 to the third party content providers 38, who would then use the metadata keywords to query their respective content repositories. In an alternative embodiment, the content server 16 may transmit the XML content file 26 to the third party content providers 38, who then extract the metadata keywords to form query parameters.

As an example, the content server 16 could collect from a local database(s) 36 and third-party content providers 38 using GPS and timestamp metadata 26 for a particular image 18 the following content 24:

1) A map
2) City, country
3) Weather: temperature, barometer readings, conditions, pollen count,
4) Local news headlines and articles
5) World news headlines and articles
6) Astronomical information
7) Sunrise/Sunset times, Moon phases, Tide information
8) Poplar music on the given date
9) television programming on the given date More specifically, the content server 16 may have a pre-established relationship with weather site, a music site, and a news organization, for instance. The content server 16 may send the GPS and timestamp metadata 26 to these three sites to retrieve weather information, top Billboard hit songs, and news clips, respectively, for the designated date and location. For example, assume a particular image had a capture date of Mar. 28, 1984, and a GPS location corresponding to Columbus, Ohio. The content thus retrieved by the content server 16 may include the weather and news on Mar. 28, 1984, in Columbus, Ohio, and songs such as "Thriller" by Michael Jackson.

In step 112, the content server 16 returns the collected content 24 to the enhanced image application 22 in a pre-defined format, such as an XML file.

If in step 102 it is determined that content 24 has been previously associated with the image 18, then in step 114 it is determined whether the external content 24 is older than a predetermined time threshold, where the time threshold may be established by the user. If the content 24 is older than the predetermined time threshold, then new content 24 is collected by the process performed in steps 104 through 112. For certain types of content, this step is necessary since the enhanced image application 22 may store the content 24 returned from the content server 16 and it is possible that overtime the content 24 may become stale or need updating (e.g., the storing of restaurant listings based on GPS location). In one embodiment, content updating may occur by simply having the content server 16 produce a fresh set of content 24 based on the same set of metadata 26. In another embodiment, the content server 16 may store a copy of the content 24, and when the enhanced image application 22 requests an update, the enhanced image application 22 only sends an identifier of the image 18 to the content server 16. The content server 16 looks up the cached content 24 with the image identifier and queries the local content repository 36 or third party content providers 38 for new content that is not cached. If any is found, the content server 16 returns the new content 24.

In this embodiment, an automatic method for updating the content is described, but the enhanced image application 22 may also allow user triggered updates from the GUI. It should be understood that for some types of content 24, no updates are necessary (e.g., popular songs at a specified date) because the information never changes. In this case, the time threshold may be set such that an update operation in not invoked.

After the content 24 has been collected and received via steps 104 through 112, or it has been determined that updated content 24 is already associated with the image 18 via steps 102 and 114, then in step 116, the enhanced image application 22 performs one or more requested operations on the image and the content 24. According to the exemplary embodiment, the operations that may be performed on the image 18 and content 24 include 1) storing the content 24 along with the image 18 to a mass storage device 20 (DVD, HD-DVD, etc.) or to another location, preferably as an XML file; and/or 2) displaying the content 24 in real-time with the image 18 on a display device. As used herein, the display operation may also include playing the content 24 depending on the type of content 24 involved. For example, text and static image types of content may be displayed, while video, MPEG, MP3 and streaming media types of content may be played on the computing device 12. During the display operation, the enhanced image application 22 may be configured to either discard the content 24 shortly after the display operation, or to store a copy of the content 24 on the local hard drive (e.g., as an XML file) such that when the image is displayed again, the content may be retrieved and displayed or played.

Figure 5:
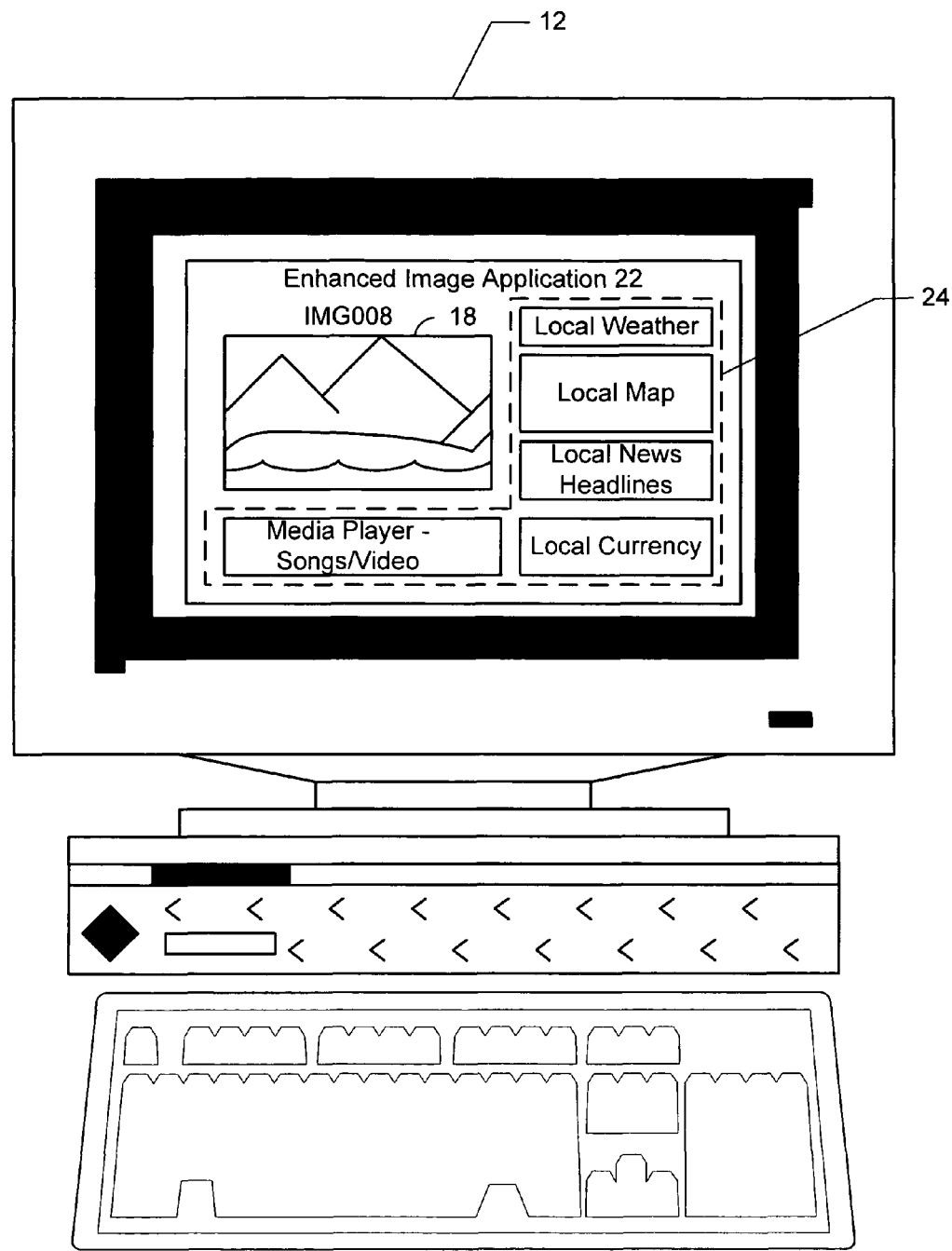
FIG. 5 is a block diagram showing an illustrative GUI of the enhanced image application displaying example content along with an associated image.

FIG. 5 is a block diagram showing an illustrative GUI of the enhanced image application 22 displaying example content 24 along with an associated image 18. When a user selects an image 18 for display, the enhanced image application 22 includes a viewing module that is configured to find the XML content file 26 associated with the image 18, read the content 24 in the XML file, and display the content 24 contemporaneously with the image on the user's computing device 12. In the example shown, the content 24 displayed with image 18 includes astronomical information, weather conditions, a map, local headlines, and local currency that was collected and returned from the content server 16 based on GPS and timestamp metadata extracted from the image 18. If the content 24 included popular songs based on the date of the image, then the enhanced image application 22 may also play the songs and videos to the user through a media player during image viewing. According to the preferred embodiment, displaying content 24 associated with the image through the image metadata 26, such as playing songs that were popular at the time the image was captured, may significantly help the user recall memories associated with the image and better enjoy the images.

The present invention also may include a computer-readable medium containing program instructions for associating external content with a digital image. In accordance with embodiments of the present invention, the program instructions may extract metadata from the digital image and use the extracted metadata to query an online content server to retrieve content related to the digital image through at least one attribute of the extracted metadata. Moreover, the program instructions may associate the content with the digital image in response to receiving the content returned by the content server and use the content when an operation is performed on the digital image.

A method and system for associating external content with a digital image has been disclosed. The present invention has been described in accordance with the embodiments shown, and one of ordinary skill in the art will readily recognize that there could be variations to the embodiments, and any variations would be within the spirit and scope of the present invention. For example, both the enhanced image application 22 and the content server 16 may be part of an image archival site where users upload their images for archival. The content 24 retrieved by content server for each image may be stored in a central storage repository. In addition, a viewing module for viewing the images and the content may be made available to the users as a web browser plug-in. Accordingly, many modifications may be made by one of ordinary skill in the art without departing from the spirit and scope of the appended claims.

I claim:

1. A method for associating external content with a digital image, comprising:
    obtaining the digital image from a first device;
    extracting GPS location and date metadata from the digital image, the date metadata comprising information recorded contemporaneously with the generation of the digital image;
    using the extracted date metadata to query an online content server to retrieve a song that was popular on the date identified by the date metadata, the online content server being a different device from the first device;
    in response to receiving the song returned by the online content server, associating the song with the digital image; and
    displaying the digital image and playing the song concurrently to a user.

2. The method of claim 1 further comprising storing the song along with the digital image when the digital image is stored.

3. The method of claim 2 wherein performing the store operation on the digital image includes at least one of archival, saving, and backup operations.

4. The method of claim 3 wherein performing the store operation further includes storing both the digital image and the song to at least one of a local hard drive and a mass storage device.

5. The method of claim 1 wherein extracting the metadata occurs in response to receiving a request to enhance one or more selected images.

6. The method of claim 5 wherein the request to enhance the one or more selected images is initiated by the user through a graphical user interface of an image application, and automatically initiated by the image application in response to a preconfigured operation specified by the user.

7. The method of claim 6 wherein the image application is configured to initiate collection of the song for the digital image in response to operations including image import, image viewing, and image storage.

8. The method of claim 6 further including allowing the user to select a batch of digital images for which to collect songs, wherein the user configures the image application to apply filters on the batch such that the image application requests songs for only digital images that pass the filter.

9. The method of claim 6 wherein the metadata is extracted from the digital image when the image application determines that no song has been previously associated with the digital image, or determines that if song has been previously associated with the digital image, then the song is older than a predetermined time threshold.

10. The method of claim 1 wherein associating the song with the digital image further includes storing the song in a file and associating the file with the digital image through a file naming convention.

11. The method of claim 1 wherein associating the song with the digital image further includes storing the song as one more records in a database, and using an identifier of the digital image as an index to the records.

12. A computing device, comprising:
    a memory for storing digital images, wherein at least a portion of the digital images include GPS location and date metadata;
    an image application stored in the memory; and
    a processor for executing the image application, wherein when executed, the image application is functional for:
        obtaining the digital images from a first device;
        extracting the GPS location and date metadata from at least one of the digital images, the date metadata comprising information recorded contemporaneously with the generation of the at least one digital image;
        using the date metadata to query an online content server to retrieve a song that was popular on the date identified by the date metadata, the online content server being a different device from the first device;
        in response to receiving the song returned by the online content server, associating the song with the at least one digital image; and
        displaying the at least one digital image and playing the song concurrently.

13. The computing device of claim 12 wherein the processor is further functional to store the song along with the at least one digital image when the at least one digital image is stored.

14. The computing device of claim 13 wherein performing the store operation on the at least one digital image includes at least one of archival, saving, and backup operations.

15. The computing device of claim 14 wherein performing the store operation further includes storing both the at least one digital image and the song to at least one of a local hard drive and a mass storage device.

16. The computing device of claim 12 wherein extracting the date metadata occurs in response to receiving a request to enhance one or more selected images.

17. The computing device of claim 16 wherein the request to enhance the one or more selected images is initiated by the user through a graphical user interface of the image application, and automatically initiated by the image application in response to a preconfigured operation specified by the user.

18. The computing device of claim 17 wherein the image application is configured to initiate collection of the song for the at least one digital image in response to operations including image import, image viewing, and image storage.

19. The computing device of claim 16 wherein the image application allows the user to select a batch of digital images for which to collect songs, wherein a user configures the image application to apply filters on the batch such that the image application requests songs for only digital images that pass the filter.

20. The computing device of claim 16 wherein the date metadata is extracted from the digital image when the image application determines that no song has been previously associated with the at least one digital image, or determines that if song has been previously associated with the at least one digital image, then the song is older than a predetermined time threshold.

21. The computing device of claim 12 wherein the image application associates the song with the at least one digital image by storing the song in a file and associates the file with the digital image through a file naming convention.

22. The computing device of claim 12 wherein the image application associates the song with the at least one digital image by storing the song as one more records in a database, and uses an identifier of the digital image as an index to the records.

23. The computing device of claim 12 wherein the image application is implemented by one of being provided as an enhancement to an existing image application, provided as a stand-alone application, and provided as a plug-in module for another application.

24. A computer-readable medium containing program instructions for associating external content with a digital image, the program instructions for:
- obtaining the digital image from a first device;
- extracting GPS location and date metadata from the digital image, the date metadata comprising information recorded contemporaneously with the generation of the digital image;
- using the extracted date metadata to query an online content server to retrieve a song that was popular on the date identified by the date metadata, the online content server being a different device from the first device;
- in response to receiving the song returned by the online content server, associating the song with the digital image; and
- displaying the digital image and playing the song concurrently to a user.

25. A method for associating external content with a digital image, comprising:
- obtaining, by a computer, a digital image comprising metadata and image data;
- extracting, by the computer, the metadata from the digital image, wherein the metadata comprises GPS location and date metadata, the date metadata identifying a date on which the image data was generated;
- obtaining, by the computer, a song that was popular on the date identified by the date metadata from a content server based on the date metadata; and
- displaying, by the computer, the image data and the content concurrently to a user via a user interface.

* * * * *